April 12, 1955 R. K. SEDGWICK 2,705,888
FLUID PRESSURE TESTING DEVICE
Filed April 28, 1950 2 Sheets-Sheet 1

INVENTOR.
Robert K. Sedgwick
BY
Orrin O.B. Garner
Atty.

April 12, 1955  R. K. SEDGWICK  2,705,888
FLUID PRESSURE TESTING DEVICE
Filed April 28, 1950  2 Sheets-Sheet 2
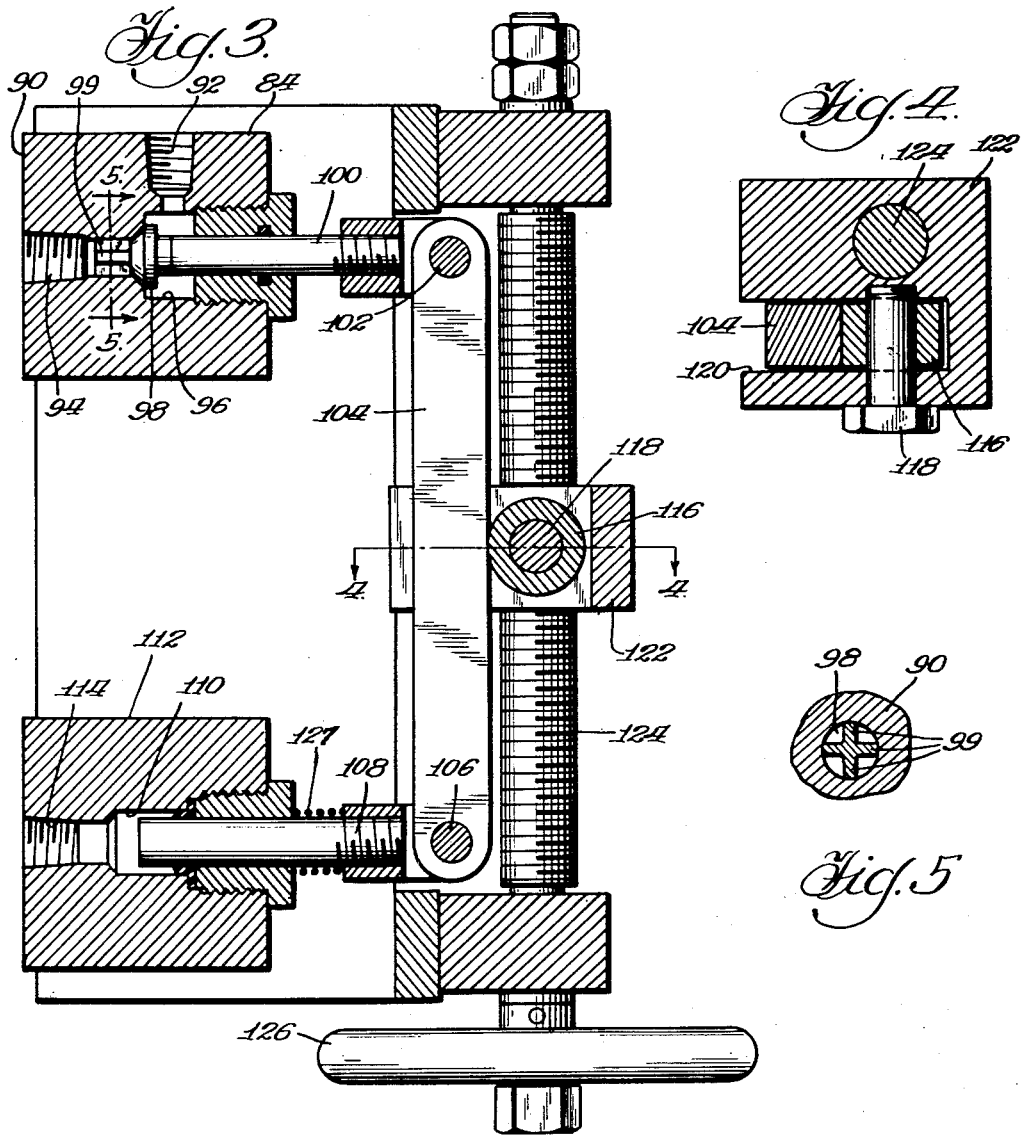
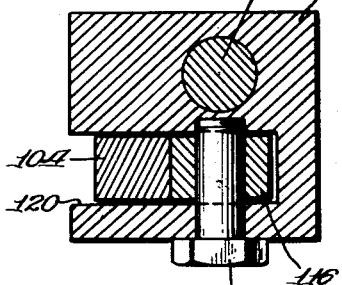
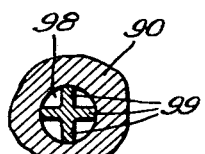
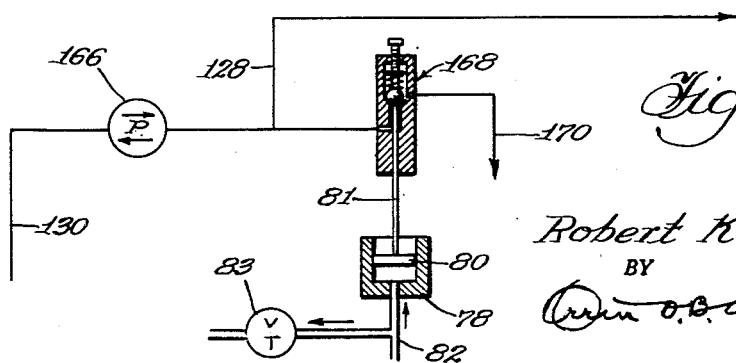
INVENTOR.
Robert K. Sedgwick
BY
Orrin O. B. Garner
Atty.

United States Patent Office 2,705,888
Patented Apr. 12, 1955

2,705,888

FLUID PRESSURE TESTING DEVICE

Robert K. Sedgwick, Sharonville, Ohio, assignor to American Steel Foundries, Chicago, Ill., a corporation of New Jersey Application April 28, 1950, Serial No. 158,781

7 Claims. (Cl. 73—37)

This invention relates to the testing of hollow articles under internal pressure and more particularly to means for quickly and economically testing such articles without the risk of crushing them under the sealing pressure required to withstand the internal test pressure to which the articles are subjected during testing.

A general object of the invention is to devise means for quickly and economically testing such articles at various test pressure values.

A further object of the invention is to devise a system whereby articles having openings of various cross-sectional areas may be sealed by adjusting the ratio of sealing pressure to the internal test pressure within the article.

Another object of the invention is to avoid crushing of the tested article by delaying the application of sealing pressure thereto until the test pressure has been developed within the article.

Still another object of the invention is to control the value of the sealing pressure against the article by the test pressure to which the interior of the article is subjected, thereby preventing the application of excessive sealing pressures, particularly if the test pressure in the article should fail.

Still another object of the invention is to devise means by which the sealing pressure may be quickly adjusted to any desired ratio with respect to the test pressure within the article, thereby accommodating adaptation of the system to articles having ports or openings of various cross-sectional areas to be sealed during testing of the articles by subjecting the interior thereof to pressures of various predetermined values.

The foregoing and other objects and advantages of the invention will become apparent from a consideration of the following specification and the accompanying drawings wherein:

Figure 3 is an enlarged view, partly in vertical cross section, of the variable ratio, pressure equalizer shown in Figure 1;

Figure 1:
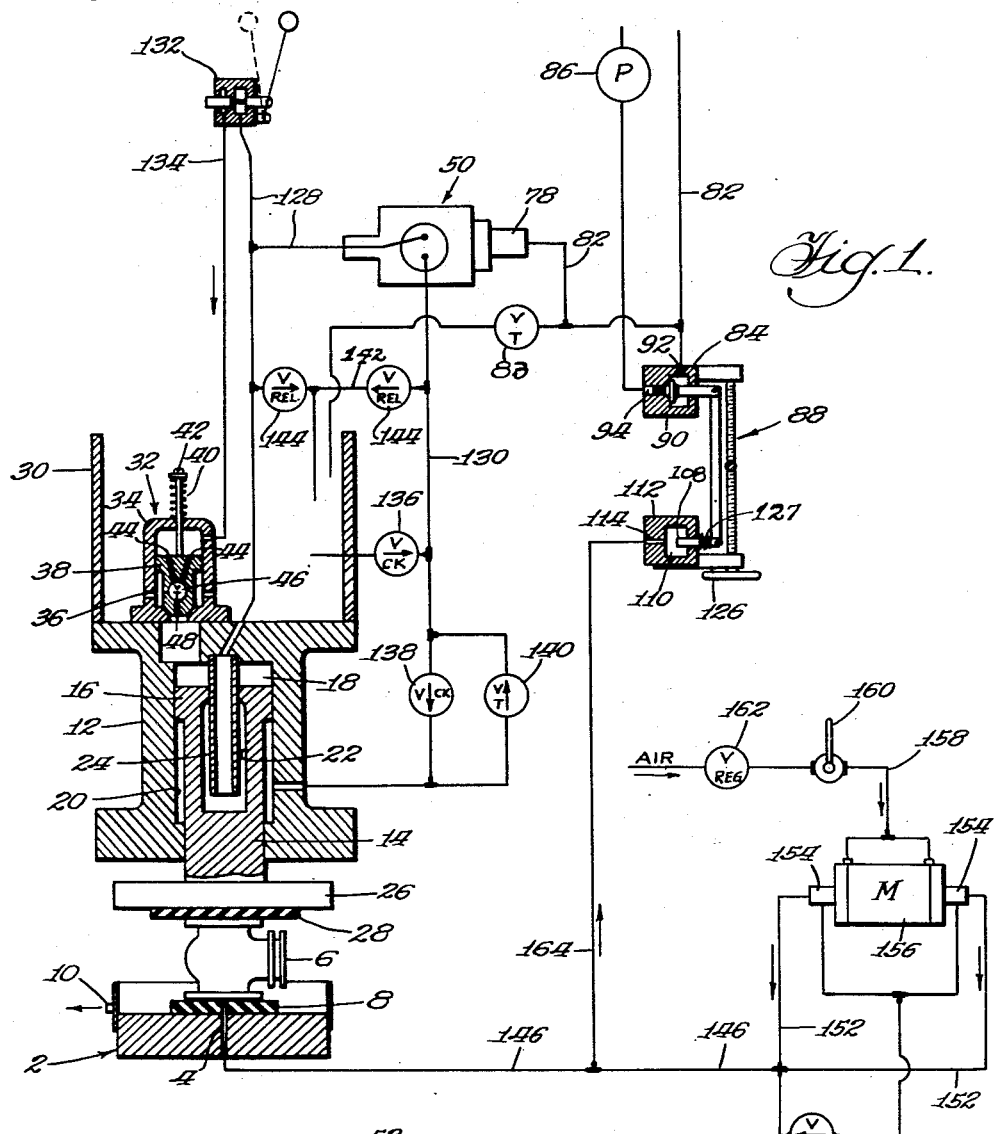
Figure 1 is a flow diagram of a novel hydraulic system by which the invention may be practiced.

Figures 4 and 5 are sectional views taken respectively on the lines 4—4 and 5—5 of Figure 3; and Figure 6 is a fragmentary flow diagram illustrating a modification of the system shown in Figure 1.

Describing the invention in detail and referring first to Figure 1, the novel system comprises a hydraulic press including a bed 2 having a port or passage 4 adapted to convey test pressure to the interior of a hollow article such as a fitting 6, with an opening therethrough, one end of which opening is adapted to be closed by a seal 8 formed of any suitable material, such as a pad of rubber. The bed 2 is also provided with a drain 10.

The press comprises a cylinder 12 containing a ram 14 having a head 16 defining an advance chamber 18 and a return or pull back chamber 20 within the cylinder 12. The ram is hollow and contains a chamber 22 receiving a tube or pipe 24 slidably fitted within the top of the chamber 22 in substantially fluid-tight engagement with the interior of the ram head 16. The ram 14 carries a platen 26 having a seal 28 affixed thereto, in any convenient manner, and adapted to close the top or other end of the opening in the article 6.

The cylinder 12 supports a reservoir or tank 30 of low pressure hydraulic fluid, such as, for example, oil; and the tank 30 contains a conventional prefill valve 32 which may be of any suitable design. The valve 32 is diagrammatically illustrated in the form of a casing 34 having ports 36 communicating with the fluid in the tank 30, said casing 34 containing a valve stem 38 normally actuated to open position by a spring 40 reacting against a spindle 42 connected to the top of the stem 38. In its closed position, the stem 38 is adapted to cut off communication between the ports 36 and the advance chamber 18 of the cylinder 12. The stem 38 is provided with one or more longitudinal passages 44 communicating with a throttle valve 46 within the stem 38, which is connected by a port 48 to the chamber 18.

Figure 2:
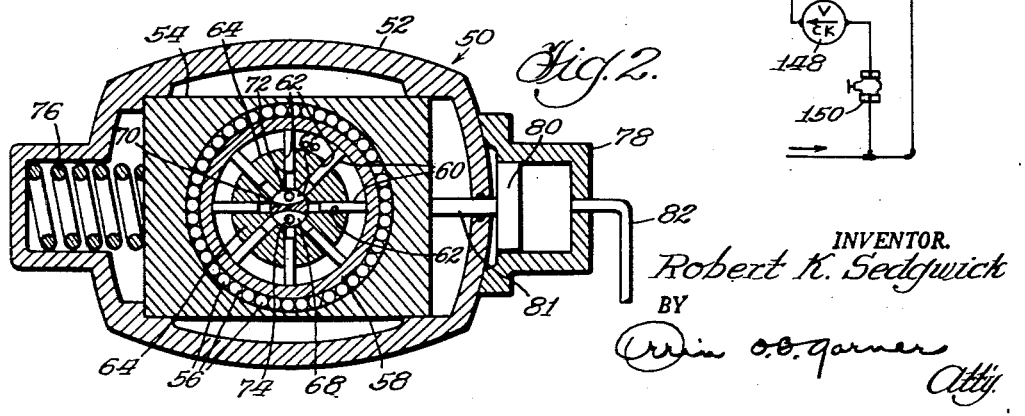
Figure 2 is an enlarged diagrammatic cross-sectional view of the main hydraulic pump shown in Figure 1.

The ram 14 is actuated by hydraulic pressure fluid from a conventional reversible discharge, variable delivery pump 50, which may be of any desired construction, a simplified form of such pump being somewhat diagrammatically shown in Figure 2 for the purpose of clarifying the operation of the system. As shown in Figure 2, the pump 50 comprises a casing 52 containing a slide block 54 which, in turn, contains a plurality of anti-friction bearings, such as ball or roller bearings 56 supporting a ring 58 slidably engageable with a plurality of radial plungers 60 slidably mounted in complementary pump chambers 62 within a pump rotor 64, which is rotated by any desired motor means (not shown). The chambers 62, at their radially inner extremities, communicate with an axial flow passage 66 through the center of the rotor 64, said passage containing a shaft 68 slidably fitted in the passage 66. The shaft 68 is provided with a portion 70 of reduced cross-sectional area dividing the passage 66 into a pair of chambers, communicating respectively with ports 72 and 74 through the shaft 68.

In the neutral position of the pump shown in Figure 2, the ring 58 and shaft 68 are concentric, whereby, during rotation of the rotor 64, the pressure delivery of the pump is approximately zero. Upon actuation of the block 54 by a spring 76 in the casing 52, the block 54 and ring 58 are urged toward the right relative to the shaft 68, as seen in Figure 2. Under these conditions, assuming that the rotor 64 is rotating in a clockwise direction, the plungers 60, due to the action of centrifugal force, will move outwardly within their respective chambers 62 when the chambers are in communication with the port 72, and will move inwardly with respect to said chambers when the chambers are in communication with the port 74. Thus fluid is sucked from the port 72 and is delivered to port 74. It will be understood that under these conditions, the pressure of liquid discharged from the port 74 is dependent upon the pressure of the spring 76 against the block 54, so that by counteracting this pressure, as hereinafter described, the pressure value of hydraulic liquid delivered by the pump may be regulated or controlled.

It may be noted that by rotating the shaft 68 approximately 90° to neutral position, the discharge of the pump will be approximately zero regardless of the pressure of spring 76, and by rotating the shaft approximately 180°, the discharge of the pump will be reversed with the port 74 being a suction port and the port 72 being a pressure or discharge port.

As above noted, the pressure of the spring 76 against the slide 54 is controlled to adjust the pressure at which hydraulic fluid is delivered by the pump, and this is accomplished by a hydraulic motor in the form of a cylinder 78 secured to the casing 52, said cylinder containing a piston 80 which actuates a rod 81 engageable with the slide 54 and adapted to oppose or counteract the thrust of the spring 76 thereagainst. Thus the pressure value of fluid delivered by the pump is inversely proportional to the hydraulic pressure in cylinder 78. The cylinder 78 is connected to a control line 82 communicating through a throttle valve 83 (Figure 1) with the tank 30. The line 82 is connected to a throttle valve 84, through which pressure fluid is delivered to the line 82 from a pilot pump 86.

As best seen in Figure 3, the throttle valve 84 constitutes part of a variable ratio, pressure equalizer generally designated 88 and serving a purpose hereinafter disclosed in detail in connection with the operation of the system. The throttle valve 84, as shown in Figure 3, comprises a body 90 containing a port 92 connected to the before mentioned control line 82 and containing another port 94 connected to the pressure side of the pilot pump 86. These ports communicate with each other through a chamber 96 within which is disposed a valve 98, having guides 99 slidably fitted in port 94, said valve 98 being actuated by a stem 100 and adapted to resist or throttle flow of fluid from the port 94 to the port 92.

The stem 100 is pivotally connected as at 102 to one end of a beam or lever 104, the opposite end of which is pivotally connected as at 106 to a plunger 108 received within a chamber 110 in a body 112 having a port 114 connected as hereinafter described to the test pressure in the article 6.

The beam 104 is engaged intermediate its ends with a fulcrum roller 116 (Figure 3) rotatably mounted on a pin 118 within a jaw 120 of a fulcrum block 122 which is threaded on a shaft 124 and functions as a traveling nut during rotation of the shaft as, for example, by a hand wheel 126 to adjust the fulcrum point of the lever or beam 104. A compression spring 127 is sleeved over the plunger 108 for normally biasing the valve 98 to closed position, thereby affording slight resistance to flow of fluid from the port 94 to the port 92.

Referring again to Figure 1, it will be seen that the pump 50 is connected to an advance line 128 and a return line 130, which may be alternately connected to the pump ports 72 and 74 by rotation of shaft 68, as above described, to reverse the discharge of the pump with respect to these lines. The advance line 128 is connected to the tube 24 and to a selector valve 132 which, in normal position, blocks flow of fluid from the line 128 to the prefill valve 32 under which condition valve 32 is held open by spring 40. Upon actuation of the valve 132, the line 128 is connected to a line 134 which communicates with the top of the prefill valve casing 34 for the purpose of actuating the prefill valve stem 38 to closed position, whereupon fluid from the line 134 is delivered through the throttle valve 46 to the main advance chamber 18, as hereinafter described in connection with the operation of the system.

The return or pullback line 130 is connected to the tank 30 by a one-way check valve 136 accommodating flow of fluid to the line 130 and is connected to the return chamber 20 by a one-way check valve 138 accommodating flow of fluid to the chamber 20. The chamber 20 is also connected to the line 130 by a throttle valve 140 which prevents flow of fluid from the line 130 to the return chamber 20 but accommodates throttled flow of fluid from the return chamber 20, the valve 140 thus being adapted to hold the ram 14 in elevated position when the pump 50 is in neutral.

The lines 130 and 128 are interconnected by a line 142 having a pair of safety valves 144 adapted to relieve pressure in either line 128 or 130 by discharge to tank 30, upon development of a predetermined maximum pressure value in the system.

Fluid, such as water, is delivered to the port 4 and thence to the tested article 6 under the desired test pressure by a line 146 connected by a one-way check valve 148 and a shut-off valve 150 to a low pressure source (not shown) such as, for example, a conventional municipal water supply line. The line 146 is connected downstream of the check valve 148 to one or more high pressure lines 152 to which high pressure water is supplied by any desired means, such as a pair of pumps 154 actuated by a pneumatic motor 156 of the type disclosed in my copending application, Serial No. 38,093, filed July 10, 1948, said motor being actuated by a compressed air line 158 having a shut-off valve 160 and a pressure regulator valve 162. The line 146 is connected by a line 164 to the port 114 and chamber 110 for actuation of the plunger 108. For this reason, the equalizer 88 is automatically effective to regulate pressure delivered by the pump 50 in direct proportion to that in the article 6 which is connected to the line 152.

In operation of the novel system, the tested article 6 is disposed, as illustrated, with one end of its opening against the seal 8, whereupon the pump is actuated to advance position whereat hydraulic fluid is delivered under relatively low pressure, afforded by the action of spring 127, to the advance line 128 and thence to the tube 24, whereupon the seal 28 is engaged with the upper end of the opening through the article 6. The pressure developed within the advance chamber 22 of the ram 14 at this time is at a much lower value than that required to seal the article 6 under the test pressure to be delivered by the high pressure water lines 152, as hereinafter described.

With the platen 26 resting lightly on the top of the article 6, the valve 150 is opened until the article 6 is filled with water, which is forced by the low pressure in line 146 from between the seals 8 and 28 into the drain 10. At this time, the valve 150 is closed, and the valve 160 is opened to actuate the motor 156 thereby developing hydraulic pressure in the lines 152 at any desired test value predetermined by adjustment of the pressure regulator 162.

As pressure within the lines 152 and the article 6 increases due to actuation of the pumps 154, pressure also increases in the line 164 thereby increasing the pressure in chamber 110 against the plunger 108, whereupon the valve 98 is actuated to further increase resistance to flow of hydraulic fluid from the port 94 to the port 92, thereby causing a pressure drop in the cylinder 78 and proportionately increasing the pressure delivered by the pump 50, which is in advance position, whereat fluid is drawn from line 130 and is discharged into advance line 128.

Thus, it will be understood that test pressure within the article 6 builds up to the maximum predetermined value, and pressure in the advance line 128, which is controlled, as above described, by the pressure in lines 152, 164, and article 6, builds up to a predetermined value dependent upon the pressure in line 164 and adjustment of the fulcrum roller 116 to positively seal the article 6, preventing flow of test fluid therefrom.

It may be noted, at this point, that the ram pressure against the article 6 may be adjusted by the hand wheel 126 within a range of relatively low pressure values with the selector valve 132 in the position shown in the drawings whereat the fluid is delivered by the line 128 to the tube 24, and is cut off from communication with the line 134. Upon actuation of the valve 132 to connect the line 128 to the line 134, the pump pressure is delivered to the entire cross-sectional area of the ram accommodating adjustment of ram pressure by hand wheel 126 within another range of relatively high pressure values.

It may be noted that, although increase of pump pressure in line 128 is preferably automatically controlled, as above described, by the variable ratio, pressure equalizer 88 so that full sealing pressure against the article 6 is not developed until the maximum test pressure has been developed therein, if desired, the same result could be obtained by regulating pump pressure entirely manually and the pressure line 146 could be equipped with a gauge to indicate the increase of pressure therein.

Referring now to Figure 6, a modification of the invention is disclosed wherein a reversible discharge, constant delivery pump 166 is substituted for the variable delivery pump of the previously described embodiment, and the advance line 128 is provided with an adjustable spring pressed relief valve 168 adapted to discharge by a line 170 into the tank 30 (not shown in Figure 6). The cylinder and piston device 78, 80, and 81 is connected to the valve 168 for opposing the action of the valve 168 in response to increase of pressure within the cylinder 78. Thus, as in the previously described embodiment, it will be understood that in the modification of Figure 6, an increase of pressure in the cylinder 78 proportionately decreases the pressure in the line 128 and a decrease of pressure in the cylinder 78 proportionately increases pressure in the line 128.

It will be understood that in either of the described embodiments, various anti-hunt devices may be utilized in connection with the hydraulic cylinder and piston device 78, 80; however, to simplify the illustration, such devices are not disclosed inasmuch as they are conventional in the art.

I claim:

1. A device of the class described comprising a bed member, a hydraulic motor including a cylinder having an advance chamber and a ram member therein, said ram member having an internal advance chamber spaced from the first-mentioned advance chamber, means carried by at least one of the members for sealing an opening in a hollow article to be tested, a source of pressure fluid connected to the interior of said article, a pump having means for discharging hydraulic fluid at varying pressure values, a selector valve connected to the discharge side of the pump and to said advance chambers, said valve being adapted in one position to deliver fluid from the pump to the second-mentioned advance chamber and being adapted in another position to deliver fluid from the pump to both advance chambers, normally open prefill valve means in the connection between said selector valve and the first-mentioned advance chamber, said prefill valve means being adapted upon delivery of pressure fluid therein from said selector valve to cut off communication between the first-mentioned advance chamber and a reservoir of low pressure fluid and to deliver pressure fluid to said first-mentioned advance chamber, a fluid cylinder and piston device connected to the pump and adapted upon increase of pressure in the device to proportionally decrease the pressure delivered by the pump, said device being adapted upon decrease of pressure delivered thereto to proportionally increase the pressure delivered by the pump, a second cylinder and piston device connected to the source of test pressure fluid, a lever connected to said second device for actuation thereby, an adjustable fulcrum for said lever, a throttle valve connected to said lever for actuation thereby, and means for delivering pressure fluid through said throttle valve to the first-mentioned device.

2. A device of the class described comprising hydraulic motor means for sealing an article to be tested, said motor means comprising cylinder means and ram means reciprocal therein, a source of pressure test fluid connected to the interior of said article, means for delivering hydraulic fluid to said cylinder means at varying pressure values, a lever having one end thereof acted upon by the pressure from said source, a throttle valve connected to the opposite end of said lever, a fulcrum connected to said lever intermediate its ends, means for adjusting the position of said fulcrum between the ends of the lever, a control device connected to said delivering means and having a hydraulic connection to said valve, a pilot pump delivering fluid through said valve to said device, said device being adapted upon decrease of pressure delivered thereto from said valve to proportionally increase the pressure of hydraulic fluid delivered by said delivering means, and said device being adapted upon increase of pressure in fluid delivered thereto from said valve to proportionally decrease the pressure of hydraulic fluid delivered by said delivering means.

3. An apparatus for testing hollow articles under pressure comprising a line for delivering pressure fluid to the interior of said article, a first pump connected to said line, a hydraulic motor comprising a cylinder and a ram reciprocal therein, means operated by said ram for sealing said article, a second pump for delivering hydraulic pressure fluid to said cylinder, pressure responsive control means for controlling the pressure of hydraulic fluid delivered by said second pump, said control means being adapted to regulate the pressure of hydraulic fluid delivered by said second pump in inverse ratio to pressure applied to said control means, a third pump connected to said control means for delivering pressure fluid thereto, a valve for yieldingly throttling flow of fluid from said third pump to said control means, and a piston and cylinder device having a fluid connection to said line, said device having a mechanical connection to said valve for urging the latter toward closed position thereof by the pressure in said line.

4. An apparatus for testing hollow articles under pressure comprising a line for delivering pressure fluid to the interior of said article, a hydraulic motor comprising a cylinder and a ram reciprocal therein, means operated by said ram for sealing said article, means for delivering hydraulic pressure fluid to said cylinder, pressure responsive control means for controlling the pressure of hydraulic fluid delivered by said delivering means, said control means being adapted to regulate the pressure of hydraulic fluid delivered by said delivering means in inverse ratio to pressure applied to said control means, a source of pressure fluid connected to said control means, a valve for yieldingly throttling flow of fluid from said source, and means connecting said valve to said line for yieldingly urging the valve toward closed position thereof by the pressure in said line, said last mentioned means comprising a lever connected to the valve, a plunger connected to the lever and received within a chamber subjected to pressure from said line, and an adjustable fulcrum for said lever.

5. An apparatus for testing hollow articles under pressure comprising a line for delivering pressure fluid to the interior of said article, a hydraulic motor comprising a cylinder and a ram reciprocal therein, means operated by said ram for sealing said article, means for delivering hydraulic pressure fluid to said cylinder, pressure responsive control means for controlling the pressure of hydraulic fluid delivered by said delivering means, said control means being adapted to regulate the pressure of hydraulic fluid delivered by said delivering means in inverse ratio to pressure applied to said control means, a source of pressure fluid connected to said control means, a valve for yieldingly throttling flow of fluid from said source, and means connecting said valve to said line for yieldingly urging the valve toward closed position thereof by the pressure in said line, said ram being provided with spaced advance areas within the cylinder, and valve means for delivering fluid from the delivering means to one or both of said areas.

6. A device of the class described comprising a bed member, a hydraulic motor including a cylinder having an advance chamber and a ram member reciprocal therein toward and away from the bed member, means carried by at least one of said members for sealing an opening in an article to be tested, a source of pressure test fluid connected to the interior of said article, pump means independent of said source for delivering hydraulic fluid at an adjustable pressure value to said cylinder, and control means continuously and proportionately responsive to variations of pressure in the test fluid within said article, a pilot pump connected to the control means for delivering pressure fluid thereto, a throttle valve for throttling flow of fluid from said pilot pump to said control means, and a piston and cylinder device connected to said source and to said throttle valve for actuating the latter in direct proportion to the pressure value of fluid delivered by said source to said article.

7. A device of the class described comprising a bed member, a hydraulic motor including a cylinder having an advance chamber and a ram member therein, said ram member being reciprocal toward and away from the bed member, means carried by at least one of said members for sealing an article to be tested, a source of pressure test fluid adapted to deliver said fluid to said article, means for delivering hydraulic fluid at an adjustable pressure value to said cylinder, and a fluid pressure device connected to the delivering means and adapted to continuously increase and decrease the pressure value of fluid delivered thereby in direct proportion to the value of pressure exerted against said device, and a fluid connection between the interior of said article and said device, whereby the latter is effective to automatically adjust the pressure delivered by said delivering means in response to variations of pressure in said article, the connection of said device to said delivering means comprising a piston and cylinder device acting on said delivering means, a pilot pump connected to said last mentioned device for delivering pressure actuating fluid thereto, a throttle valve for throttling flow of fluid to said last mentioned device from said pilot pump, and a mechanical connection between said fluid pressure device and said throttle valve for actuating the latter to variably throttle flow of fluid from said pilot pump in response to variation of pressure in said article.

References Cited in the file of this patent

UNITED STATES PATENTS

| Number | Name | Date |
|---|---|---|
| 1,613,150 | Zore | Jan. 4, 1927 |
| 1,811,138 | Lassman | June 23, 1931 |
| 2,326,345 | Ernst et al. | Aug. 10, 1943 |
| 2,329,035 | Cross | Sept. 7, 1943 |
| 2,522,927 | Camerota | Sept. 19, 1950 |